Aug. 15, 1967   H. M. KENNARD ET AL   3,335,919
PISTON IMPACT SNUBBER AND BRAKE
Filed Sept. 27, 1965   2 Sheets-Sheet 1

INVENTORS
HARRY M. KENNARD
RAYMOND A. MARVINNEY
BY
William R. Wright
AGENT

Aug. 15, 1967  H. M. KENNARD ETAL  3,335,919
PISTON IMPACT SNUBBER AND BRAKE

Filed Sept. 27, 1965  2 Sheets-Sheet 2

INVENTORS
HARRY M. KENNARD
RAYMOND A. MARVINNEY
BY
*William R. Wright Jr.*
AGENT

3,335,919
PISTON IMPACT SNUBBER AND BRAKE

Harry M. Kennard, Whippany, and Raymond A. Marvinney, Franklin Lakes, N.J., assignors to Thiokol Chemical Corporation, Bristol, Pa., a corporation of Delaware
Filed Sept. 27, 1965, Ser. No. 490,522
17 Claims. (Cl. 222—389)

This invention relates generally to cushioning means and more particularly to an impact snubber or brake for the piston of a positive displacement, liquid expulsion system.

In piston explusion devices, high piston impact forces can be generated when the liquid level is below or not in contact with the piston before its initial movement due to volume changes because of temperature variations which is known as temperature change ullage. The impact forces can also be unsymmetrical if the surface of the liquid is not parallel to the piston surface.

Such impact conditions are usually encountered at startup of packaged liquid propulsion systems where the piston has become separated from the liquid to be expelled because of a liquid volume decrease caused by a temperature depression between the time of loading the liquid and the time of start of the operation.

These impact forces result because the piston is initially driven through the ullage space where resistance to its motion is low and attains a high velocity before impacting into or fully into the liquid. Such impacting has proven to be destructive to both piston and liquid tank enclosure structures.

Accordingly, the main object of the present invention is to provide a light weight device for use in a piston actuated, positive displacement, liquid expulsion system, which will prevent excessive impact of the piston upon the liquid during the initial piston movement at the start of system operation.

An important object of the present invention is to provide a novel, light weight device for a piston actuated, liquid expulsion apparatus which provides direct contact at all times between the liquid and the piston despite temperature change ullage to lessen the impact of the piston on the liquid.

Another important object of the present invention is to provide a novel means in an apparatus of the type described which is deformable to prevent excessive piston impact on the liquid.

A further important object of the present invention is to provide a novel means in an apparatus of the type described which provides high resistance to piston motion whether the piston is in the liquid or not to prevent high piston velocity and excessive piston-liquid impact.

A still further important object of the present invention is to provide novel means to prevent excessive piston-liquid impact in an apparatus of the type described so as to permit the use of positive expulsion pistons of conventional materials of construction with high energy rocket engine liquid propellants.

Another important object of the present invention is to provide a novel device of the type described which at the end of piston travel, is fully compressed against the end wall of the liquid tank to assure sufficient volumetric and expulsion efficiency and a minimum weight penalty in the expulsion apparatus for flight units.

Other objects and advantages of the invention will become apparent during the course of the following description.

In the drawings we have shown several embodiments of the invention. In these showings:

Figure 1:
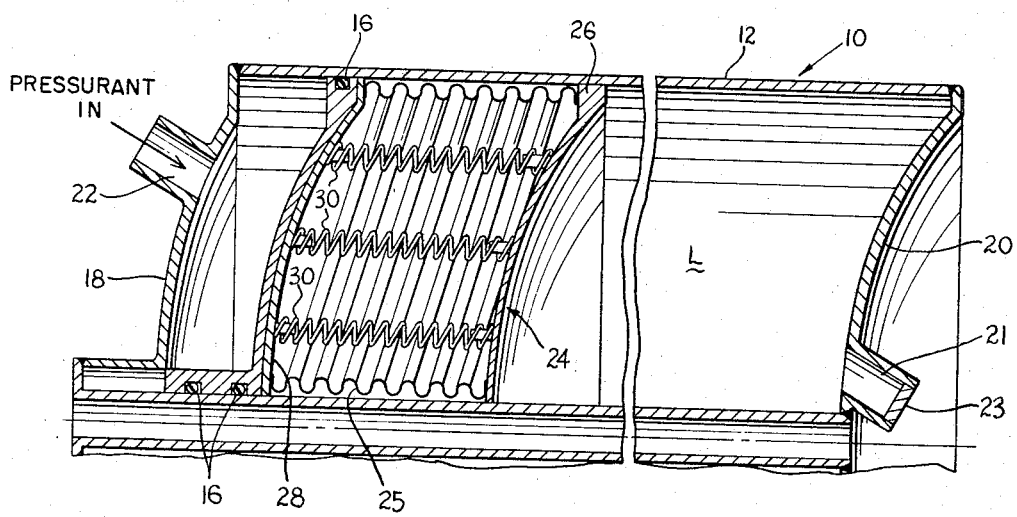
FIGURE 1 is a fragmentary, central, longitudinal sectional view of one form of the invention.

Referring to FIGURE 1 of the drawings, numeral 10 designates as a whole an apparatus comprising a piston actuated, positive displacement liquid expulsion system which primarily includes a liquid containing tank 12 which may be of any desired shape and is illustrated as being annular, a rigid piston 14 sealably mounted therein by O-rings 16 for movement from the left end 18 to the right end 20 of the tank 12, under the influence of gas pressure from a suitable source admitted to the tank on the left side of the piston by a pressurizing port 22 to effect expulsion of the liquid from the right end by a discharge conduit 21 which may be closed by a burst disc 23, etc.

Arranged between the piston 14 and the liquid L in the tank 12 is a member indicated as a whole as 24 which provides resistance to initial movement of the piston 14 to thus prevent excessive impact thereby on the liquid. The member 24 comprises an evacuated bellows 25 having a liquid contacting end plate 26 and a piston contacting end plate 28 (FIGURE 1), or the bellows 25 and end plate 26 being fixed directly to the piston 14. Mounted within the bellows 25 and on and between the end plate 26 and the other end plate 28 (or the piston 14) are a plurality of compression springs 30 which automatically extend sufficiently to cause the volume of the resistance member 24 to conform exactly with the existing temperature change ullage of the liquid L.

When liquid, propellant, etc. is to be expelled from the tank 12, pressurizing gas is admitted from a suitable source (not shown) through the port 22 and against the left side of the piston 14 which acts initially on the resistance affording member or bellows 25 and thus is prevented from impacting the liquid with excessive and destructive force.

It is to be noted that the resistance member 24 bellows 25 is of such design that all acceleration conditions affecting position of the liquid L are compensated for with negligible increase of pressure of the pressurant over a similar system in which the resistance member 24 is not employed. During periods of pressurization to effect ejection of the liquid, and especially at the end of travel of the piston 14 (FIGURE 3) adjacent the tank end wall 20, the resistance member 24 is fully compressed against the wall so that volumetric and expulsion efficiency and a minimum weight penalty in flight units is assured.

Figure 2:
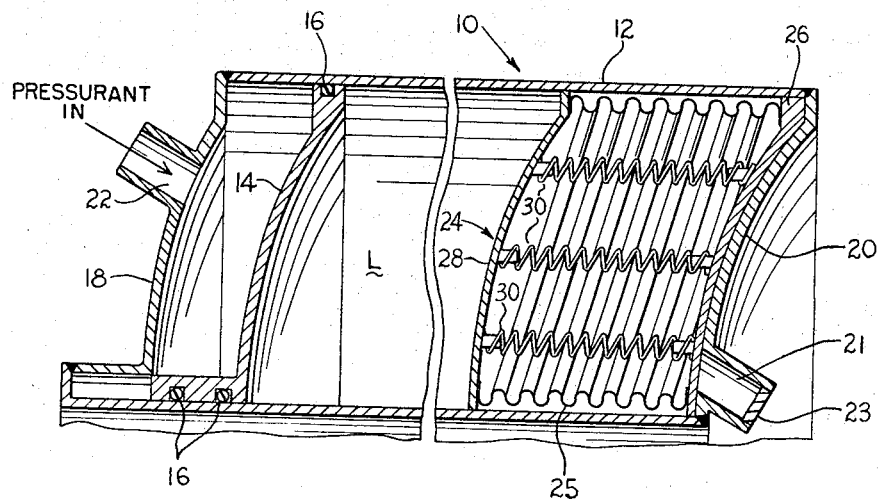
FIGURE 2 is a similar view of another form thereof.
Figure 3:
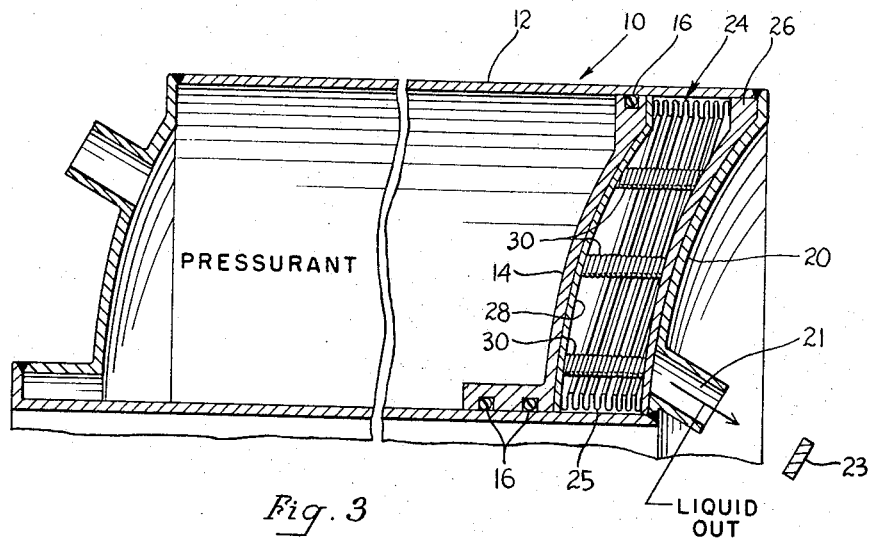
FIGURE 3 is a similar view illustrating the compressed position of the excessive impact-preventing or resistance means at the end of the stroke of the liquid expelling piston.

As contrasted with the showing of FIGURE 1 wherein the resistance unit or member 24 is separate from and positioned against or integral with and fixed to the piston 14, it may also be fixed to the tank end wall 20 to serve the same functions as described, as is illustrated in FIGURES 2 and 3 wherein identical parts bear similar numbers. As shown, the essential difference of this form of the invention resides in the omission of the resistance member end plate 26 and the mounting of the resistance member 24 on the tank end wall 20.

Figure 4:
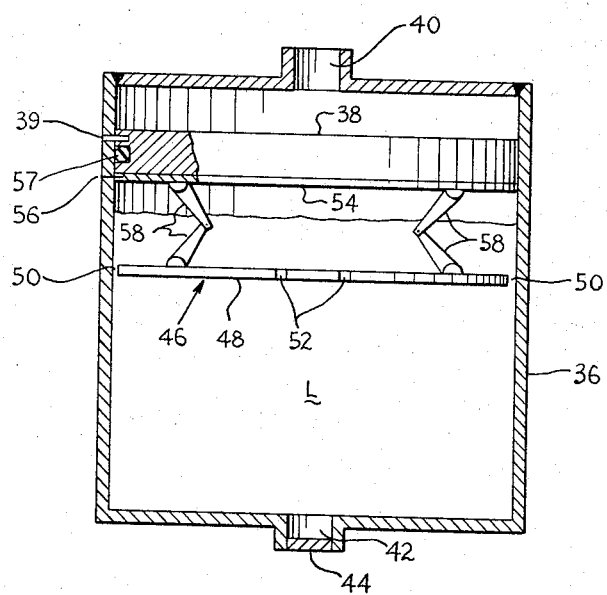
FIGURE 4 is a central, longitudinal sectional view of a further form of the invention.

In the form of the invention disclosed in FIGURE 4, a cylindrical liquid containing tank 36 is employed as is a circular piston 38 which is sealably mounted for sliding movement therein by O-rings, etc. 57 upon the admission to and against its upper side of a pressurizing gas or other medium from a suitable source by the inlet port 40, the liquid L, of course, being expelled from a discharge port 42 which may be provided with a burst disc, etc. 44. The piston 38 is maintained in the pre-expulsion position shown by a shear pin 39.

Arranged between the piston 38 and the liquid L in the tank 36 is another form of resistance member indicated as a whole by numeral 46 which includes a circular disc 48 of lesser diameter than the tank 36 to define an annular bypass or damping space 50. The disc is also provided with a plurality of orifices 52 and it is to be noted that the degree of resistance afforded by the member 46 to movement of the piston 38 is regulated by the area of the space 50 and the orifices 52.

The disc 48 of the resistance member 46 is spaced from and fixed to the piston 38—or to a separate plate 54 abutting the piston and also provided with a shear pin 56—by a plurality of collapsible legs 58 which fold back at the end of the piston stroke to allow the piston to nest properly in the bottom of the tank 36.

In operation, motion of the piston 38 is started by introducing the pressurized gas or other medium to the tank through the inlet port 40 to build up a force sufficient to shear the pin 39 (or the pin 56 when the disc 48 is mounted on the plate 54). As the piston 38 begins to move, its motion is resisted by the disc 48 which already contacted or was immersed in the liquid L, to damp the piston movement to the degree regulated by the area of the bypass space 50 and orifices 52. The liquid L is expelled through the discharge port 42 as soon as the pressure on the liquid has risen high enough to burst the disc 44. After the piston 38 has moved sufficiently to cause the disc 48 of the resistance member 46 to engage the bottom (or end) of the tank 36, the supporting legs 58 collapse and permit the piston to also bottom.

It is to be understood that the forms of our invention herewith shown and described are to be taken as preferred examples of the same and that various changes in the shape, size and arrangement of parts may be resorted to without departure from the spirit of the invention or the scope of the subjoined claims.

We claim:

1. A device for preventing excessive rigid piston-liquid impact upon initiation of piston liquid-ejecting movement in the tank of a piston actuated, positive displacement, liquid ejection apparatus subject to temperature effected volume variations comprising an expansible-biased, collapsible member arranged between and continuously contacting the piston and the liquid to provide resistance to initial piston movement to minimize said piston-liquid impact.

2. The device recited in claim 1 wherein said member is expansible to occupy the space between the piston and the liquid.

3. The device recited in claim 2 wherein said member is fixed to the piston.

4. The combination recited in claim 1 wherein said member includes a disc of smaller diameter than the tank to function as a dashpot while moving through the liquid.

5. A device for preventing excessive rigid piston-liquid impact upon initiation of piston liquid-ejecting movement in the tank of a piston actuated, positive displacement, liquid ejection apparatus subject to temperature effected volume variations comprising an expansible-biased, collapsible member fixed to the piston and extending into contact with the liquid to provide resistance to initial piston movement to minimize said piston-liquid impact.

6. The device recited in claim 5 wherein said member is expansible to occupy only the space between the piston and the liquid.

7. The device recited in claim 6 wherein said member is fixed to the piston.

8. A device for preventing excessive rigid piston-liquid impact upon initiation of piston liquid-ejecting movement in the tank of a piston actuated, positive displacement, liquid ejection apparatus subject to temperature effected volume variations comprising an expansible-biased, collapsible member arranged between the piston and the liquid ejecting end of the tank to compensate for the volume variations and ensure resistance to initial piston movement.

9. A device for preventing excessive rigid piston-liquid impact upon initiation of piston liquid-ejecting movement in the tank of a piston actuated, positive displacement, liquid ejection apparatus subject to temperature change ullage comprising an expansible-biased, contractible member positioned in the tank to occupy and vary with the ullage space.

10. A device for preventing excessive piston-liquid impact upon initiation of piston liquid-ejecting movement in the tank of a piston actuated, positive displacement, liquid ejection apparatus subject to temperature effected volume variations comprising a member arranged between and contacting the piston and the liquid to provide resistance to initial piston movement to minimize piston-liquid impact, said member being collapsible by said piston at the end of its liquid ejecting movement.

11. A device for preventing excessive piston-liquid impact upon initiation of piston liquid-ejecting movement in the tank of a piston actuated, positive displacement, liquid ejection apparatus subject to temperature effected volume variations comprising a member arranged between and contacting the piston and the liquid to provide resistance to initial piston movement to minimize piston-liquid impact, said member comprising a sealed bellows.

12. A device for preventing excessive piston-liquid impact upon initiation of piston liquid-ejecting movement in the tank of a piston actuated, positive displacement, liquid ejection apparatus subject to temperature effected volume variations comprising a bellows member arranged between and contacting the piston and the liquid to provide resistance to initial piston movement to minimize piston-liquid impact, and compression springs mounted within said bellows to extend it into contact with the piston and the liquid.

13. A device for preventing excessive piston-liquid impact upon initiation of piston liquid-ejecting movement in the tank of a piston actuated, positive displacement, liquid ejection apparatus subject to temperature effected volume variations comprising a member arranged between and contacting the piston and the liquid to provide resistance to initial piston movement to minimize piston-liquid impact, said member including a disc of smaller diameter than the tank to function as a dashpot while moving through the liquid.

14. A device for preventing excessive piston-liquid impact upon initiation of piston liquid-ejecting movement in the tank of a piston actuated, positive displacement, liquid ejection apparatus subject to temperature effected volume variations comprising a member fixed to the piston and extending into contact with the liquid to provide resistance to initial piston movement to minimize piston-liquid impact, said member being collapsible by said piston at the end of its liquid ejecting movement.

15. A device for preventing excessive piston-liquid impact upon initiation of piston liquid-ejecting movement in the tank of a piston actuated, positive displacement, liquid ejection apparatus subject to temperature effected volume variations comprising a member fixed to the piston and extending into contact with the liquid to provide resistance to initial piston movement to minimize piston-liquid impact, said member comprising a sealed bellows.

16. A device for preventing excessive piston-liquid impact upon initiation of piston liquid-ejecting movement in the tank of a piston actuated, positive displacement, liquid ejection apparatus subject to temperature effected volume variations comprising a bellows member fixed to the piston and extending into contact with the liquid to provide resistance to initial piston movement to minimize piston-liquid impact, and compression springs mounted within said bellows to extend it into contact with the piston and the liquid.

17. A device for preventing excessive piston-liquid impact upon initiation of piston liquid-ejecting movement in the tank of a piston actuated, positive displacement, liquid ejection apparatus subject to temperature effected volume variations comprising a member arranged between the piston and the liquid ejecting end of the tank to compensate for the volume variations and ensure resistance to initial piston movement, said member being fixed to the liquid ejecting end of the tank.

References Cited

UNITED STATES PATENTS

| | | | |
|---|---|---|---|
| 2,714,855 | 8/1955 | Brown | 103—52 |
| 2,766,694 | 9/1956 | Vincent | 103—52 |
| 2,979,897 | 4/1961 | Studhalter et al. | 222—389 X |
| 3,033,426 | 5/1962 | Young | 222—389 X |

ROBERT B. REEVES, *Primary Examiner.*

HADD S. LANE, *Examiner.*